US012561670B2

(12) United States Patent
Benkreira et al.

(10) Patent No.: US 12,561,670 B2
(45) Date of Patent: Feb. 24, 2026

(54) CARD FOR SECURE PARKING VALIDATION

(71) Applicant: Capital One Services, LLC, McLean, VA (US)

(72) Inventors: Abdelkader M'Hamed Benkreira, Brooklyn, NY (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 532 days.

(21) Appl. No.: 17/445,021

(22) Filed: Aug. 13, 2021

(65) Prior Publication Data

US 2023/0049580 A1     Feb. 16, 2023

(51) Int. Cl.
G06Q 20/34     (2012.01)
G06K 7/10     (2006.01)
*G06F 8/61*     (2018.01)

(52) U.S. Cl.
CPC ..... G06Q 20/3563 (2013.01); G06K 7/10366 (2013.01); *G06F 8/61* (2013.01); *G06Q 2240/00* (2013.01)

(58) Field of Classification Search
CPC ........... G06Q 2240/00; G06Q 20/3563; G06Q 20/3278; G06K 7/10366; G06F 8/61
USPC .......................................................... 705/13
See application file for complete search history.

(56) References Cited

U.S. PATENT DOCUMENTS

| | | | |
|---|---|---|---|
| 2008/0052254 A1 | 2/2008 | Al Amri | |
| 2015/0025947 A1* | 1/2015 | Dutta | G06Q 50/40 |
| | | | 705/13 |
| 2017/0178122 A1* | 6/2017 | Flinter | G06Q 20/36 |
| 2017/0213262 A1 | 7/2017 | Kelley, II et al. | |

FOREIGN PATENT DOCUMENTS

| | | | | |
|---|---|---|---|---|
| EP | 0980055 A1 * | 2/2002 | ........... | G07F 17/246 |

* cited by examiner

*Primary Examiner* — Igor N Borissov
(74) *Attorney, Agent, or Firm* — Harrity & Harrity, LLP

(57)     ABSTRACT

In some implementations, a card may communicate with an exchange terminal to complete the first exchange associated with an entity, wherein the first exchange is associated with the entity providing a validation of a second exchange associated with a charge for parking a vehicle. The card may receive, from the exchange terminal, an indication of the validation code based on communicating with the exchange terminal to complete the first exchange, wherein the validation code indicates the validation of the second exchange. The card may store the validation code and a time indicator associated with receiving the indication of the validation code. The card may transmit, to an exit terminal, an indication of the validation code and the time indicator to cause an amount associated with the second exchange to be at least partially reduced, wherein the exit terminal is associated with completing exchanges for vehicles parked in the location.

20 Claims, 7 Drawing Sheets

400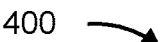

410 — Execute an application stored in a memory of the transaction card, wherein the application is associated with enabling the transaction card to store and transmit validation codes 420 — Communicate with an exchange terminal to complete the first exchange associated with an entity, wherein completing the first exchange is associated with the entity providing a validation of a second exchange associated with a charge for parking a vehicle 430 — Receive, from the exchange terminal, an indication of the validation code associated with at least one of the entity or a location based on communicating with the exchange terminal to complete the first exchange, wherein the validation code indicates the validation of the second exchange 440 — Store, in the memory of the transaction card, the validation code and a time indicator associated with receiving the indication of the validation code, wherein the time indicator indicates at least one of an exchange time associated with the first exchange or an amount of time for which the validation code is valid 450 — Transmit, to an exit terminal, an indication of the validation code and the time indicator to cause an amount associated with the second exchange to be at least partially reduced, wherein the exit terminal is associated with completing exchanges for vehicles parked in the location

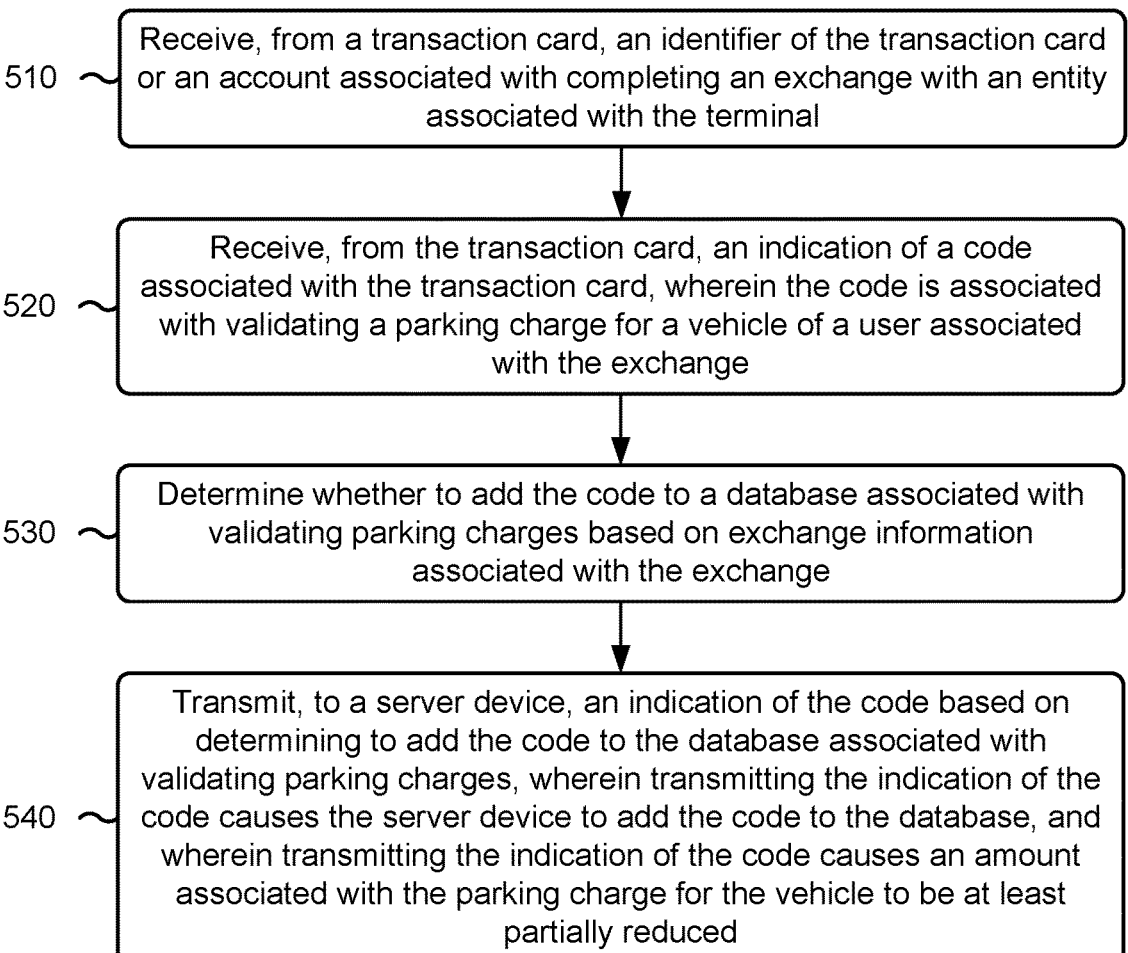

510 — Receive, from a transaction card, an identifier of the transaction card or an account associated with completing an exchange with an entity associated with the terminal 520 — Receive, from the transaction card, an indication of a code associated with the transaction card, wherein the code is associated with validating a parking charge for a vehicle of a user associated with the exchange 530 — Determine whether to add the code to a database associated with validating parking charges based on exchange information associated with the exchange 540 — Transmit, to a server device, an indication of the code based on determining to add the code to the database associated with validating parking charges, wherein transmitting the indication of the code causes the server device to add the code to the database, and wherein transmitting the indication of the code causes an amount associated with the parking charge for the vehicle to be at least partially reduced

FIG. 5

CARD FOR SECURE PARKING VALIDATION

BACKGROUND

An applet may include a small application that performs a limited set of tasks. An applet may run within the scope of a dedicated engine or a larger program. For example, an applet may be a plug-in. In some cases, an applet may be designed to run on a web page. In some examples, a card, such as a transaction card, may include a memory and/or a controller capable of storing and executing an applet.

SUMMARY

Some implementations described herein relate to a card for secure parking validation by storing a validation code in the card that is associated with a first exchange. The card may include a radio frequency (RF) component, an integrated circuit (IC) chip component, one or more memories, and one or more processors. The one or more processors may be coupled to the one or more memories. The one or more processors may be configured to execute an application stored in the one or more memories, wherein the application is associated with enabling the card to store and transmit validation codes. The one or more processors may be configured to communicate, via the RF component or the IC chip component, with an exchange terminal to complete the first exchange associated with an entity, wherein completing the first exchange is associated with the entity providing a validation of a second exchange associated with a charge for parking a vehicle. The one or more processors may be configured to receive, via the RF component or the IC chip component and from the exchange terminal, an indication of the validation code associated with at least one of the entity or a location based on communicating with the exchange terminal to complete the first exchange, wherein the validation code indicates the validation, by the entity, of the second exchange. The one or more processors may be configured to store, in the one or more memories and via the application, the validation code and a time indicator associated with receiving the indication of the validation code. The one or more processors may be configured to detect, via the RF component or the IC chip component, that the card is within a communicative proximity of an exit terminal associated with the location. The one or more processors may be configured to transmit, via the RF component or the IC chip component and to the exit terminal, an indication of the validation code and the time indicator to cause an amount associated with the second exchange to be at least partially reduced.

Some implementations described herein relate to a method for secure parking validation by storing a validation code in a transaction card that is associated with a first exchange. The method may include executing, by the transaction card, an application stored in a memory of the transaction card, wherein the application is associated with enabling the transaction card to store and transmit validation codes. The method may include communicating, by the transaction card, with an exchange terminal to complete the first exchange associated with an entity, wherein completing the first exchange is associated with the entity providing a validation of a second exchange associated with a charge for parking a vehicle. The method may include receiving, by the transaction card and from the exchange terminal, an indication of the validation code associated with at least one of the entity or a location based on communicating with the exchange terminal to complete the first exchange, wherein the validation code indicates the validation of the second exchange. The method may include storing, by the transaction card in the memory of the transaction card, the validation code and a time indicator associated with receiving the indication of the validation code, wherein the time indicator indicates at least one of an exchange time associated with the first exchange or an amount of time for which the validation code is valid. The method may include transmitting, by the transaction card and to an exit terminal, an indication of the validation code and the time indicator to cause an amount associated with the second exchange to be at least partially reduced, wherein the exit terminal is associated with completing exchanges for vehicles parked in the location.

Some implementations described herein relate to a non-transitory computer-readable medium that stores a set of instructions for a terminal. The set of instructions, when executed by one or more processors of the terminal, may cause the terminal to receive, from a transaction card, an identifier of the transaction card or an account associated with completing an exchange with an entity associated with the terminal. The set of instructions, when executed by one or more processors of the terminal, may cause the terminal to receive, from the transaction card, an indication of a code associated with the transaction card, wherein the code is associated with validating a parking charge for a vehicle of a user associated with the exchange. The set of instructions, when executed by one or more processors of the terminal, may cause the terminal to determine whether to add the code to a database associated with validating parking charges based on exchange information associated with the exchange. The set of instructions, when executed by one or more processors of the terminal, may cause the terminal to transmit, to a server device, an indication of the code based on determining to add the code to the database associated with validating parking charges, wherein transmitting the indication of the code causes the server device to add the code to the database, and wherein transmitting the indication of the code causes an amount associated with the parking charge for the vehicle to be at least partially reduced.

BRIEF DESCRIPTION OF THE DRAWINGS

FIG. 4 is a flowchart of an example process relating to a card for secure parking validation.

FIG. 5 is a flowchart of an example process relating to a card for secure parking validation.

DETAILED DESCRIPTION

Figure 1A:
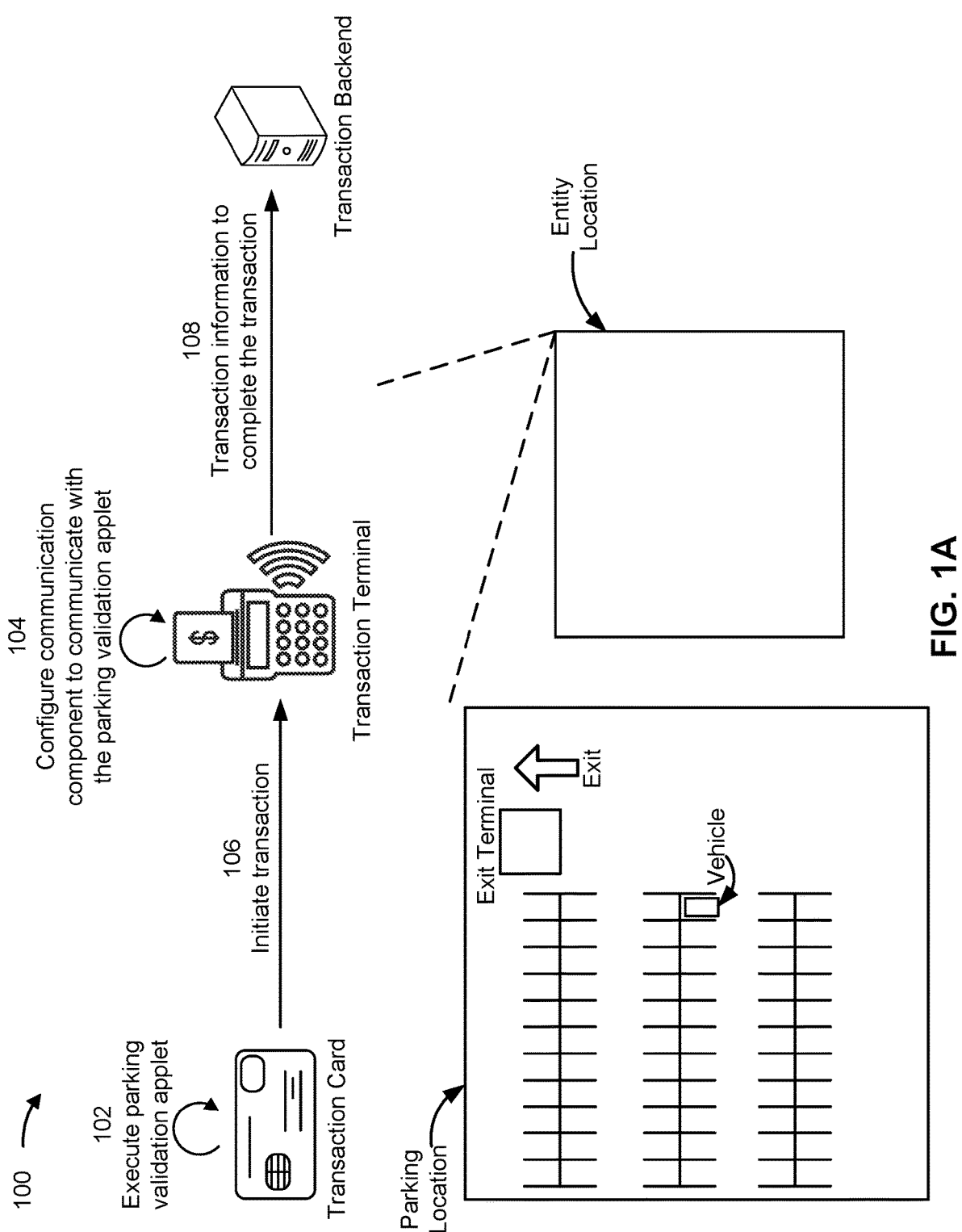
FIGS. 1A-1C are diagrams of an example implementation relating to a card for secure parking validation.

The following detailed description of example implementations refers to the accompanying drawings. The same reference numbers in different drawings may identify the same or similar elements.

"Parking validation" as used herein refers to receiving a discount on a parking fee. The discount may be for a partial amount of the parking fee or the entire amount of the parking fee. For example, parking locations, such as a parking lot or a parking garage, often charge a parking fee to a user who parks a vehicle in the parking location. In some cases, an entity (e.g., a merchant, a vendor, or another entity) may offer parking validation for patrons of the entity. For example, if a user visits and/or shops at a location of the entity, the entity may offer parking validation for the user.

Typically, parking validation is accomplished by providing an indication on a physical parking ticket (e.g., by stamping the parking ticket, punching a hole in the parking ticket, and/or placing a sticker on the parking ticket). However, manual parking validations, such as providing an indication on a physical parking ticket, are susceptible to fraud. For example, a malicious actor may easily fake or counterfeit the indication (e.g., that is provided by the entity to validate parking) on a physical parking ticket. As the indication may be the only way to determine if the parking validation is legitimate, manual parking validations may be particularly susceptible to fraud. As a result, parking validation techniques may be susceptible to fraud.

In some cases, parking validation may be accomplished by the entity providing a card to the user. For example, where the entity is a hotel, a key card (e.g., a card that is used to open or access a hotel room) may be used at a parking location to validate parking for the user. However, the key cards used for parking validation in these scenarios may be limited in use (e.g., may be a key card that is associated with the entity that provided the key card and may only be used for a purpose at the entity, such as entering a room or validating parking). Moreover, entities that do offer services that require or are associated with providing such key cards may be required to incur additional costs and complexity associated with validating parking via a key card. Additionally, for entities that do not offer such services, it may be difficult to associate the use of the key card with an event (such as a visit or a completed transaction with the entity) that qualifies for parking validation. For example, it may be difficult to store information on the key cards that enable the key cards to be used only when an event that qualifies for parking validation has taken place.

Moreover, a device associated with facilitating payment of the parking fee (e.g., a terminal located at the parking location) may not be associated with, or may not be configured to communicate with, a device (e.g., a transaction terminal at an entity) that is associated with an event, at the entity, that qualifies for parking validation. Because the devices may not be associated and/or may not be configured to communicate with each other, verifying the legitimacy of a parking validation is difficult. Therefore, transactions associated with parking validations may be unsecure and may be particularly susceptible to fraud because parking validations may be easily faked or counterfeited, making it difficult to determine if the parking validation is provided in connection with a legitimate event or transaction (e.g., with an entity that provides the parking validation).

Some techniques described herein enable a card (e.g., a multi-function transaction card) for secure parking validation. For example, the card may be associated with an account and/or a user (e.g., the card may be a credit card, a debit card, and/or a charge card, among other examples). The card may communicate with a transaction terminal of an entity to complete a transaction with the entity. The entity may offer parking validation based on a user completing a transaction with the entity. For example, the transaction may be associated with the entity providing a validation of a parking (e.g., a charge for parking a vehicle). Based on completing the exchange, the card may receive an indication of a validation code. The validation code may indicate the validation, by the entity, of the parking fee.

For example, an application (e.g., an applet) may be configured and/or stored on the card. The applet may be stored in a memory of the card. In some implementations, the applet may be associated with providing parking validation. The transaction terminal may be configured to communicate with the card via the applet. For example, the transaction terminal may be configured to transmit, to the card via the applet, the validation code when a transaction is completed using the card. The validation code may be written to, or stored by, a memory of the card. In some implementations, the card may store a time indicator associated with receiving the validation code (e.g., indicating a time at which the validation code was received and/or indicating a time when the validation code expires). The card may be presented to an exit terminal at a parking location. For example, the card may detect that the card is within a communicative proximity of the exit terminal. The card may transmit, to the exit terminal, an indication of the validation code to cause the exit terminal to apply a discount (e.g., for an entire parking fee or a portion of the parking fee) to the parking fee.

For example, a radio frequency (RF) component, a communication device, and/or an integrated circuit (IC) chip of the card may communicate with the transaction terminal and/or the exit terminal. Because the transaction terminal and/or the exit terminal may already be configured to communicate with the card (e.g., via the RF component, the communication device, and/or the IC chip), using the card for parking validation may reduce complexity. Moreover, because the card is the same card that is associated with completing the transaction (e.g., that is associated with the entity providing parking validation), security associated with the parking validation may be improved. For example, the validation code may only be provided, by a transaction terminal, to a card that is actually used to complete a transaction with the entity. Therefore, a difficulty associated with configuring or installing the validation code on a card, by a malicious actor, may be increased because the malicious actor may be unable to modify the information stored by the card and/or because the validation code may be controlled and/or periodically changed by the entity. As a result, a security associated with providing the parking validation may be improved.

In some implementations, the card may store a code (e.g., a unique identifier) associated with the card (e.g., in a memory of the card and via the applet stored by the card and/or executing on the card). The card may communicate with a transaction terminal of an entity to complete a transaction with the entity. The entity may offer parking validation based on a user completing a transaction with the entity. Based on completing the transaction with the transaction terminal, the card may transmit, to the transaction terminal, an indication of the code associated with the card. The transaction terminal may transmit, to a server device, an indication of the code to cause the code to be added to a database (e.g., a parking validation database). The parking validation database may store codes of cards that have been provided parking validation. The card may be presented to an exit terminal at a parking location. For example, the card may detect that the card is within a communicative proximity of the exit terminal. The card may transmit, to the exit terminal, an indication of the code associated with the card. The exit terminal may communicate with the server device to determine if the code is included in the parking validation database (e.g., to determine if the card has been provided parking validation by the entity). If the exit terminal receives, from the server device, an indication that the code is included in the parking validation database, then the exit terminal may apply a discount (e.g., for an entire parking fee or a portion of the parking fee) to the parking fee. Because the parking validation database may be stored in a remote, secure service device, a difficulty associated with a malicious actor fraudulently adding a code to the parking validation database may be increased. As a result, a security associated with providing the parking validation may be improved.

Figure 1B:
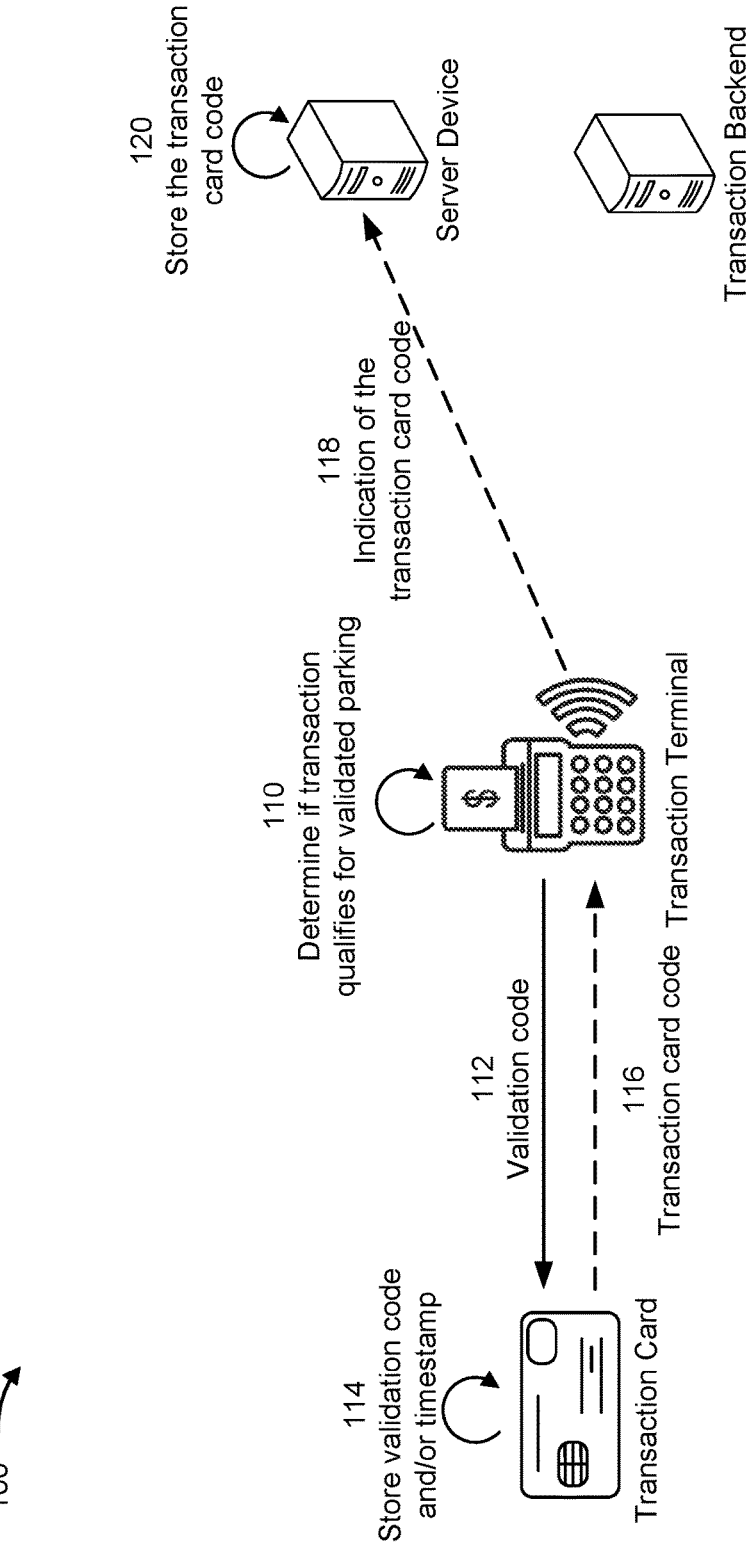
Figure 1C:
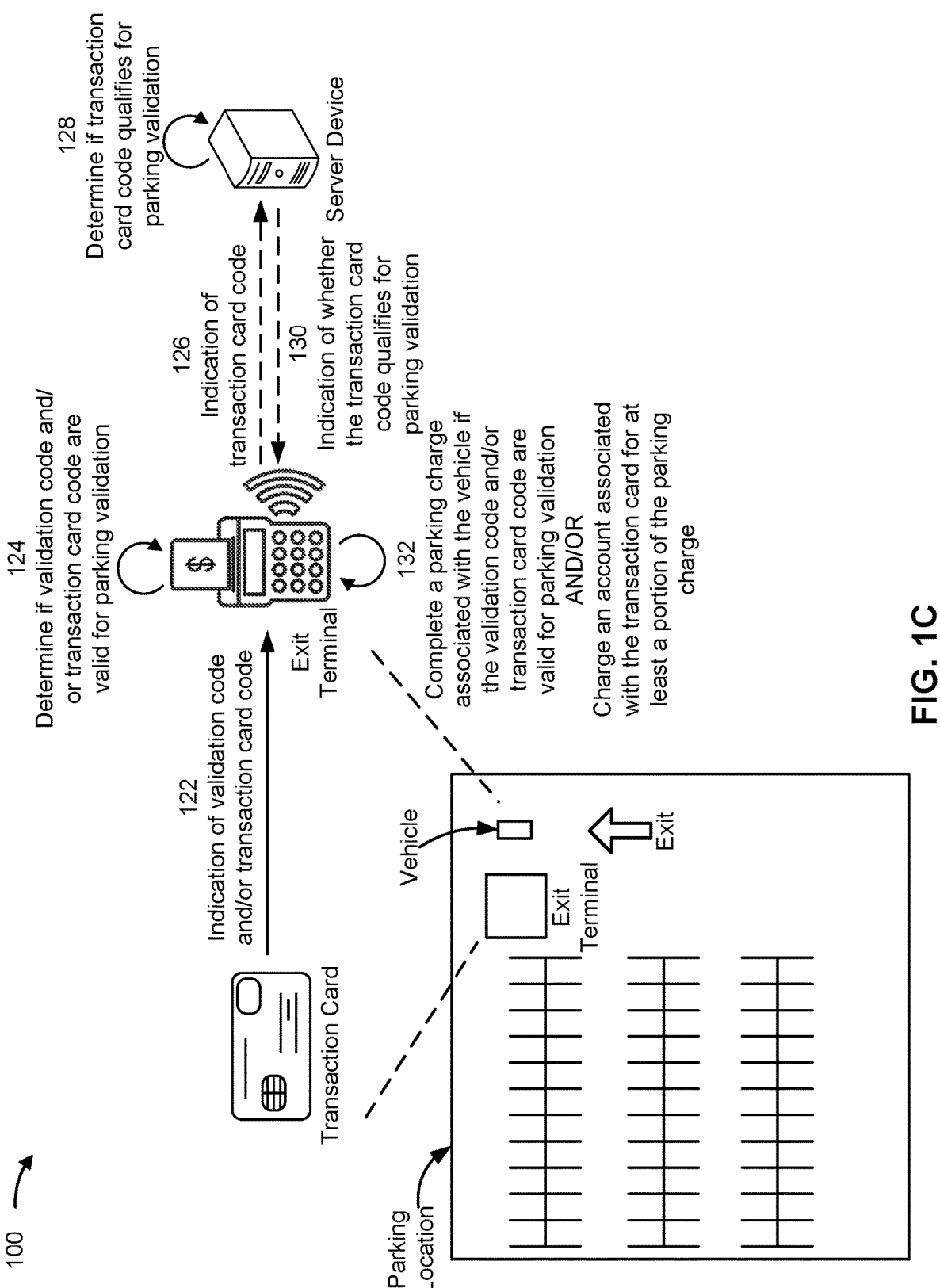

FIGS. 1A-1C are diagrams of an example 100 associated with a card for secure parking validation. As shown in FIGS. 1A-1C, example 100 includes a transaction card (e.g., a multi-function transaction card), a transaction terminal, a transaction backend, a server device, and an exit terminal. These devices are described in more detail in connection with FIGS. 2 and 3.

As shown in FIG. 1A, a user may travel to a physical location of an entity (e.g., an entity location), such as a store and/or a shopping mall, among other examples. For example, the user may drive a vehicle to the entity location. The user may park the vehicle in a parking location. "Parking location" refers to a location that is dedicated for parking vehicles, such as a parking lot, a parking garage, a parking deck, and/or a parking structure, among other examples. Often, an entity associated with the parking location may charge users for parking a vehicle in the parking location. For example, parking a vehicle in the parking location may be associated with a parking fee (e.g., a fee or charge for parking a vehicle in the parking location). For example, as shown in FIG. 1A, when the user drives the vehicle out of the parking location, the user may need to drive the vehicle near an exit terminal. The parking fee may be collected at the exit terminal (e.g., a gate or other obstruction near the exit terminal may block the vehicle from leaving the parking location until the parking fee is paid). The exit terminal may also be referred to as an exit booth, a toll booth, a payment kiosk, a payment machine, and/or a parking meter, among other examples.

In some implementations, when the user enters the parking location in the vehicle, the transaction card may be presented to the exit terminal. For example, the transaction card may be placed within a communicative proximity of the exit terminal to enable the transaction card to communicate with the exit terminal. The transaction card may detect that the transaction card is within a communicative proximity of the exit terminal. In some implementations, the transaction card may transmit, to the exit terminal, an indication of a code or unique identifier associated with the transaction card (e.g., which may be the same as, or different than, a card number associated with the transaction card). In some implementations, the exit terminal may store the code or unique identifier along with a time stamp (e.g., indicating a time at which the vehicle entered the parking location). In some implementations, the exit terminal may transmit, to the server device (not shown in FIG. 1A) an indication of the code or unique identifier along with the time stamp to enable the server device to store the code or unique identifier and the time stamp. This may enable the exit terminal and/or the server device to track an amount of time that the vehicle has been parking in the parking location (e.g., for scenarios in which the parking fee is calculated based on an amount of time that the vehicle is parking in the parking location, rather than the parking fee being a flat fee or standard amount).

As shown by reference number 102, the transaction card may execute a parking validation applet (or application). The parking validation applet may be an applet, an application, and/or a program, among other examples associated with providing secure parking validation, as described herein. In some implementations, the parking validation applet may be associated with enabling the transaction card to store and transmit validation codes, as described in more detail elsewhere herein. For example, the parking validation applet may enable the transaction card to store validation codes and/or to transmit indications of validation codes (e.g., to transaction terminals, exit terminals, and/or other devices).

The parking validation applet may be stored by a memory of the transaction card. In some implementations, the memory may be a read-only memory. In some implementations, the memory may include a read and write memory. In some implementations, the parking validation applet may be installed by an entity or institution that issues the transaction card. For example, the parking validation applet may be pre-installed, pre-configured, and/or pre-stored on the transaction card (e.g., by the entity or institution that issues the transaction card) prior to the transaction card being issued to the user.

In some implementations, the parking validation applet may be installed and/or stored on the transaction card via communicating with another device. For example, the transaction card may receive, from a user device (not shown in FIG. 1A), instructions to install the parking validation applet in one or more memories of the transaction card. For example, the transaction card and the user device may communicate via near field communication (NFC), RF communication, and/or other wireless communication methods. The user device may transmit, to the transaction card, code or other instructions to cause the parking validation applet to be stored and/or installed on the transaction card. For example, the transaction card may store the parking validation applet in one or more memories of the transaction card. In some implementations, the parking validation applet may be stored in a read-only memory of the transaction card. As a result, a processor and/or controller of the transaction card may be enabled to execute the parking validation applet to perform one or more functions associated with secure parking validation, as described herein.

As shown by reference number 104, the transaction terminal may receive instructions to configure a communication component (e.g., an NFC component, an RF component, or another communication component) of the transaction terminal to communicate with the transaction card via the parking validation applet. For example, the transaction terminal may program the communication component of the transaction terminal to communicate with the parking validation applet that is executing on one or more processors of the transaction card. In some implementations, the transaction terminal may program or configure the communication component to transmit, to transaction cards via the parking validation applet, a validation code associated with secure parking validation, as described herein. In some implementations, the transaction terminal may program or configure the communication component to receive, from transaction cards via the parking validation applet, a code or unique identifier of the transaction cards. In such examples, the transaction terminal may program or configure the communication component to transmit, to the server device, an indication of the code or unique identifier of the transaction card to enable secure parking validation, as described herein.

As shown in FIG. 1A, the transaction card and the transaction terminal may communicate to complete a transaction. "Transaction" may be used herein to refer to an exchange, an electronic exchange, a payment, an account event, and/or an event, among other examples. The transaction may be associated with the entity (e.g., the entity associated with the transaction terminal and the entity location). For example, a user may complete a transaction for a product or service at the entity location using the transaction card. The entity may offer parking validation to a user based on the user completing such transactions with the entity (e.g., for any transactions or for a transaction for an amount that satisfies a threshold amount).

The transaction card may be associated with an account (e.g., a credit account, a debit account, and/or a charge account) of the user. For example, the transaction card may be capable of providing (e.g., transmitting) an indication of an identifier of the transaction card. The identifier of the transaction card may be used, by the transaction backend, to charge the account associated with the transaction card for an amount associated with a transaction. For example, as shown by reference number 106, the transaction card may communicate (e.g., via an RV component or an IC chip component of the transaction card) with the transaction terminal (e.g., an exchange terminal) to complete a transaction (e.g., a first exchange) associated with the entity. The transaction card may transmit, to the transaction terminal, an indication of the identifier associated with the transaction card (e.g., a card number or another identifier).

As shown by reference number 108, the transaction terminal may transmit, to the transaction backend, transaction information to cause the transaction to be completed. For example, the transaction terminal may transmit an indication of the identifier associated with the transaction card, a transaction amount, an identifier of the entity, a time associated with the transaction, a date associated with the transaction, and/or a location associated with the transaction terminal, among other examples. The transaction backend may verify that the transaction can be completed. For example, the transaction backend may communicate with a device (e.g., a server) associated with the institution that issued the transaction card to verify that the transaction can be completed. For example, the device associated with the institution may verify that the account associated with the transaction card includes sufficient resources (e.g., funds or credit) to complete the transaction. Additionally, the device associated with the institution may perform a fraud analysis associated with the transaction.

If the device associated with the institution determines that the transaction can be completed, the device may transmit, to the transaction backend, an indication that the transaction is verified and/or can be completed. Based on receiving the indication from the device, the transaction backend may perform one or more actions to complete the transaction. In some implementations, the transaction backend may transmit, and the transaction terminal may receive, an indication that the transaction has been completed. The transaction terminal may perform one or more actions based on receiving the indication that the transaction has been completed, such as causing an indication that the transaction is completed to be displayed via a user interface of the transaction terminal and/or causing a receipt to be printed or transmitted (e.g., emailed or sent via short message service (SMS) messaging) to a device (e.g., a user device) associated with the user, among other examples.

As shown in FIG. 1B, and by reference number 110, the transaction terminal may determine if the transaction qualifies for validated parking. For example, the transaction terminal may receive one or more criteria for providing validated parking (e.g., for transmitting a validation code). For example, in some implementations, the criteria may include successfully completing a transaction with the transaction card. In such examples, if any transaction (e.g., regardless of a transaction amount) is completed associated with a transaction card that is executing the parking validation applet, then the transaction terminal may determine that the transaction qualifies for validated parking. In some other examples, the criteria may be associated with an amount threshold. In such examples, if a transaction is successfully completed and associated with a transaction card that is executing the parking validation applet, then the transaction terminal may determine if a transaction amount of the transaction satisfies the amount threshold. If the transaction amount satisfies the amount threshold, then the transaction terminal may determine that the transaction qualifies for validated parking. If the transaction amount does not satisfy the amount threshold, then the transaction terminal may determine that the transaction does not qualify for validated parking.

In some implementations, as shown by reference number 112, the transaction terminal may transmit, and the transaction card may receive, an indication of the validation code associated with the entity and/or the parking location. The validation code may be any code or identifier, such as a series of numbers, letters, and/or characters, that enables an exit terminal or another device to identify that parking validation has been provided by the transaction terminal (e.g., the validation code, when received by the exit terminal, enables the exit terminal to determine that parking validation has been provided by the transaction terminal). The validation code may be a flag or other indicator that indicates that a transaction that qualifies for parking validation has been completed using the transaction card. The validation code may be specific to, or associated with, the entity location. Additionally, or alternatively, the validation code may be specific to, or associated with, the one or more parking locations. This may enable an exit terminal of a parking location to identify the entity location and/or the parking location that the validation code is associated with.

The transaction terminal may transmit the validation code based on determining that the transaction qualifies for parking validation. In some implementations, in addition to, or instead of, transmitting the validation code to the transaction card, the transaction terminal may transmit an indication of the validation code to another device associated with the user, such as a user device, to enable the user device to store the validation code. In some implementations, the transaction card, after receiving the indication of the validation code, may transmit, to another device associated with the user (e.g., a user device), an indication of the validation code to enable the user device to store the validation code.

In some implementations, rather than transmitting the indication of the validation code, the transaction terminal may display an indication of the validation code or may display a machine-readable indication to enable the transaction card or a user device to read and/or store the validation code. For example, the transaction terminal may display a barcode, a matrix barcode, a Quick Response (QR) code, and/or another machine-readable code. The transaction card (e.g., via a camera or other image sensor of the transaction card) may capture the machine-readable code. The transaction card may process the machine-readable code to obtain the validation code. A user device may obtain the validation code in a similar manner.

Although examples are described herein in connection with a transaction, the transaction terminal may transmit the indication of the validation code based on other interactions with the transaction card. For example, in some implementations, the transaction terminal may transmit, to the transaction card, the indication of the validation code based on the transaction card being placed within a communicative proximity of the transaction terminal. In such examples, the transaction terminal may not be associated with completing transactions. This may enable an entity that does not sell a product or service to offer parking validation for users who visit the entity location. For example, in some cases, an entity may offer parking validation for users who visit the physical entity location, such as for an office or other business, regardless of whether the user purchases a product or service. In such examples, the transaction terminal may transmit the validation code to the transaction card without the transaction card being used to complete a transaction. This enables the transaction card to be used to validate parking (e.g., as explained in more detail elsewhere herein). Because the transaction card may be associated with the user (e.g., rather than the entity) and may provide other uses to the user (e.g., such as being capable of completing transactions), using the transaction card for secure parking validation improves user access to parking validation and reduces a complexity associated with providing parking validation.

In some implementations, the transaction terminal may transmit an indication of a time at which the validation code is transmitted and/or generated (e.g., a time indicator). The time indicator may be referred to as a time stamp. Alternatively, the transaction card (and/or user device) may determine a time at which the validation code is received and may store the time indicator based on determining the time at which the validation code is received. In some implementations, the time indicator may indicate an amount of time during which the validation code is valid (e.g., can be used for parking validation). This may improve security associated with transactions associated with parking validation as an exit terminal may be enabled to determine when a validation code was provided to the transaction card (and/or the user device). By determining when the validation code was provided, the exit terminal may be enabled to determine if the validation code can still be used, or if the validation code has expired. As a result, a malicious actor may be unable to use an old validation code (e.g., that was received days or weeks ago) to fraudulently validate parking.

As shown by reference number 114, the transaction card may store, in the memory of the transaction card (e.g., via the parking validation applet), the validation code and/or the time indicator associated with receiving the indication of the validation code. In some implementations, the transaction card may not store the time indicator. For example, in some cases, the transaction terminal (or another device associated with the transaction terminal) may periodically (e.g., in accordance with a periodic schedule) modify or change the validation code. For example, in some implementations, the server device may modify or change (e.g., periodically) the validation code. The server device may transmit, to the transaction terminal and/or the exit terminal, an indication of a new validation code (e.g., after modifying or changing the validation code). This may enable the transaction terminal, the exit terminal, and the server device to be coordinated as to which validation code is currently valid and can be used to validate parking. As a result, a malicious actor may be unable to use an old validation code (e.g., that has since been modified or changed by the server device and/or the transaction terminal) to fraudulently validate parking.

In some implementations, rather than the transaction terminal transmitting the validation code, the transaction card may transmit, to the transaction terminal, a code or unique identifier (e.g., a transaction card code) to enable secure parking validation. In some implementations, the transaction card may be different than the identifier (e.g., card number) of the transaction card to improve security of the identifier (e.g., card number) of the transaction card. For example, this may ensure that the card number, that can be used to initiate transactions, is not provided to devices unless it is to initiate a transaction, thereby reducing access to the card number or a likelihood that the card number may be obtained by a malicious actor. Alternatively, the transaction card code may be the same as the identifier (e.g., card number) of the transaction card. The transaction card code may be a code or unique identifier generated by the parking validation applet (e.g., to identify the transaction card for parking validation purposes). In some implementations, the transaction card code may be generated by another device, such as a user device, and transmitted to (and stored by) the transaction card.

For example, as shown by reference number 116, the transaction card may transmit, and the transaction terminal may receive, an indication of the transaction card code. As described elsewhere herein, the transaction card code may be associated with validating a parking charge or a parking fee for a vehicle of a user. In some implementations, a user device (e.g., rather than the transaction card) may transmit, to the transaction terminal, the indication of the transaction card code. The transaction terminal may receive the transaction card code (e.g., via communicating with the parking validation applet).

The transaction terminal may determine if an interaction with the transaction card (and/or user device) qualifies for parking validation (e.g., in a similar manner as described elsewhere herein). For example, the transaction terminal may determine whether to add the transaction card code to a database associated with validating parking charges (e.g., a parking validation database) based on transaction information (e.g., exchange information) associated with the completed transaction. The parking validation database may be stored by, or associated with, the transaction terminal and/or the server device. For example, the parking validation database may store transaction card codes for transaction cards that have been provided parking validation by the transaction terminal. For example, as described in more detail below, the exit terminal may be enabled to access the parking validation database (or communicate with the server device) to determine if a transaction card code received by the exit terminal is stored in the parking validation database.

If the transaction terminal determines that the interaction with the transaction card (e.g., and/or the user device) qualifies for parking validation, then the transaction terminal may determine that the transaction card code should be added to the parking validation database. For example, as shown by reference number 118, the transaction terminal may transmit, and the server device may receive, an indication of the transaction card code (e.g., based on determining to add the transaction card code to the parking validation database). Transmitting the indication of the transaction card code may cause the server device to add the transaction card code to the parking validation database. As shown by reference number 120, the server device may store the transaction card code in the parking validation database. For example, the server device may receive the indication of the transaction card code and may add the transaction card code to an entry in the parking validation database.

In some implementations, the transaction terminal may transmit, to the server device, an indication of an amount of time that the transaction card code should be stored in the parking validation database (e.g., indicating that the transaction card code should be removed from the parking validation database after the amount of time). In some implementations, the server device may determine to remove transaction card codes from the parking validation database after a certain amount of time. For example, the server device may remove transaction card codes from the parking validation database that have been stored for more than 12 hours, 24 hours, 36 hours, and/or 48 hours, among other examples. This may conserve memory associated with storing the parking validation database. Additionally, this may ensure that a malicious actor is not enabled to obtain parking validation a significant amount of time after the interaction with the transaction terminal that qualified the malicious actor for the parking validation, thereby improving the security of the parking validation transactions.

As shown in FIG. 1C, the user may leave the entity location after visiting the entity location by driving the vehicle out of the parking location. In order to leave the parking location, the user may be required to interact with the exit terminal. For example, the user may be required to submit a payment for a parking charge (e.g., a second transaction and/or a second exchange, where the transaction with the entity is a first transaction and/or a first exchange) associated with parking the vehicle in the parking location (e.g., a gate or other obstruction may block an exit from the parking location until the parking charge is paid for at the exit terminal).

For example, as shown by reference number 122, the transaction card may be presented at the exit terminal. The transaction card may detect (e.g., via an NFC component, RF component, and/or an IC chip component) that the transaction card is within a communicative proximity of the exit terminal (e.g., of a communication component of the exit terminal). In some implementations, the transaction card may transmit, to the exit terminal, an indication of the validation code stored by the transaction card (e.g., the validation code transmitted to the transaction card by the transaction terminal via the parking validation applet). In some other implementations, the transaction card may transmit, to the exit terminal, an indication of the transaction card code associated with the transaction card. For example, the transaction card (e.g., via the parking validation applet) may be configured to transmit the validation code and/or the transaction card code in addition to, or instead of, the identifier (e.g., the card number) of the transaction card (e.g., that is used to initiate transactions). Additionally, the transaction card may transmit, to the exit terminal, additional information to enable the exit terminal to determine if parking validation should be applied to the parking charge. The additional information may include an entity identifier associated with the entity, a card identifier (e.g., a card number or another identifier) associated with the transaction card, an identifier associated with the exit terminal (e.g., provided by the transaction terminal), and/or an identifier associated with the parking location (e.g., provided by the transaction terminal). The additional information may provide additional verification that the transaction card was involved in a legitimate interaction or transaction with the transaction terminal, thereby improving security associated with providing the parking validation.

Transmitting the information, by the transaction card, described herein may enable the exit terminal to reduce an amount associated with the parking charge based on the parking validation provided by the entity (e.g., without automatically charging the account associated with the transaction card for the full amount of the parking charge). Although examples herein describe the transaction card being presented to the exit terminal, the user device may be presented to the exit terminal to complete the secure parking validation in a similar manner.

As shown by reference number 124, the exit terminal may determine if the validation code and/or the transaction card code are active for parking validation. For example, as described elsewhere herein, the validation codes may be changed or modified (e.g., periodically). One or more active or valid validation codes may be provided to the exit terminal (e.g., by the server device). The exit terminal may determine if the validation code provided by the transaction card is a valid or active validation code. If the exit terminal determines that the validation code provided by the transaction card is an active validation code, then the exit terminal may reduce (e.g., partially or in full) the amount to be charged for the parking charge. If the exit terminal determines that the validation code provided by the transaction card is not a valid or active validation code, then the exit terminal may not reduce the amount to be charged for the parking charge.

In some implementations, the exit terminal may determine if the validation code and/or the transaction card code are active for parking validation based on a time indicator transmitted by the transaction card. For example, in addition to transmitting the indication of the validation code, the transaction card may transmit an indication of a time indicator (e.g., a time stamp) stored by the transaction card. The exit terminal may determine if the validation code is still active or valid based on the time indicator. For example, a validation code may be active or valid for a period of time after being provided to the transaction card. The exit terminal may determine, based on the period of time (e.g., for which the validation code is active or valid) and the time indicator, if the validation code is active or valid. For example, the exit terminal may determine that the validation code is valid based on a difference, between a first time indicated by the time indicator and a second time at which the validation code is transmitted to the exit terminal, satisfying a time threshold. If the exit terminal determines that the validation code provided by the transaction card is an active validation code, then the exit terminal may reduce (e.g., partially or in full) the amount to be charged for the parking charge. If the exit terminal determines that the validation code provided by the transaction card is not a valid or active validation code, then the exit terminal may not reduce the amount to be charged for the parking charge. By using the time indicator, the exit terminal may not be required to have network access to determine if the validation code is valid or active (e.g., as the exit terminal may be enabled to, locally, determine if the transaction card is an active validation code based on the time indicator).

In some implementations, such as where the transaction card transmits the indication of the transaction card code, the exit terminal may communicate with the server device to determine if the transaction card code is active for receiving parking validation. For example, the exit terminal may communicate with the server device to determine if the transaction card code is stored in the parking validation database. For example, as shown by reference number 126, the exit terminal may transmit, and the server device may receive, an indication of the transaction card code. As shown by reference number 128, the server device may determine if the transaction card code qualifies for parking validation. For example, the server device may parse or search the parking validation database for the transaction card code. If the server device identifies the transaction card code in an entry of the parking validation database, then the server device may determine that the transaction card code qualifies for parking validation. If the server device does not identify the transaction card code in any entry of the parking validation database (or if the server device determines that the transaction card code was added to the parking validation database more than a threshold amount of time ago), then the server device may determine that the transaction card code does not qualify for parking validation.

As shown by reference number 130, the server device may transmit, and the exit terminal may receive, an indication of whether the transaction card code qualifies for parking validation. The exit terminal may determine if the amount associated with the parking charge should be reduced based on the indication of whether the transaction card code qualifies for parking validation.

The reduction of the amount may be stored by the exit terminal or indicated by the server device (e.g., based on the terms of the parking validation provided by the entity). For example, the entity may provide parking validation that causes the amount of the parking charge to be reduced to zero (e.g., regardless of the amount). In some other implementations, the entity may provide parking validation that causes the amount of the parking charge to be reduced by a given amount (e.g., $10, $15, and/or $25). The exit terminal may identify the amount associated with the parking charge. If the exit terminal determines that the parking charge is associated with parking validation (e.g., based on the information provided by the transaction card), then the exit terminal may reduce the amount associated with the parking charge. For example, the amount associated with the parking charge may be based on an amount of time that the vehicle has been parked in the parking location. The exit terminal may determine the parking charge based on a time that the transaction card was presented to the exit terminal, or another terminal associated with the parking location, upon entry to the parking location as described in more detail above. The exit terminal may at least partially reduce the amount associated with the parking charge. For example, if the parking charge is $25 and the parking validation is associated with a reduction of parking charges up to $15, then the exit terminal may reduce the amount associated with the parking charge to $10. As another example, if the parking charge is $25 and the parking validation is associated with a reduction of the entire amount of parking charges, then the exit terminal may reduce the amount associated with the parking charge to $0.

As shown by reference number 132, the exit terminal may complete a parking charge associated with the vehicle if the validation code and/or the transaction card code are valid or active for parking validation, as described above. For example, if the amount associated with the parking charge is reduced to zero (e.g., $0), then the exit terminal may complete the transaction without charging any account (or may charge an account associated with the entity that provided the parking validation). If the amount associated with the parking charge is reduced to an amount greater than zero, then the exit terminal may initiate a transaction for the remaining amount associated with the parking charge. For example, if the amount associated with the parking charge is reduced to $10, then the exit terminal may charge an account associated with the transaction card for a remaining amount (e.g., $10) of the parking charge. The transaction card may transmit an indication of an identifier (e.g., that is different than the validation code and/or the transaction card code) that enables the exit terminal to charge the account associated with the transaction card. For example, the remaining amount (or the full amount) of the parking charge may be charged to the account associated with the transaction card. In other words, a transaction for the remaining amount of the parking change may be completed using resources (e.g., satisfied using resources) of the account associated with the transaction card.

The exit terminal may communicate with the transaction backend in a similar manner as described elsewhere herein in connection with the transaction terminal to complete the charge to the account associated with the transaction card. In some implementations, a different transaction card may be presented (e.g., by the user) to the exit terminal to complete a payment for a remaining amount of the parking charge.

Therefore, parking validation (e.g., for an entire amount of a parking charge or a partial amount of the parking charge) may be securely completed via the transaction card. Additionally, in the same interaction, the account associated with the transaction card may be charged, by the exit terminal, for at least a portion of the amount associated with the parking charge (e.g., or an entire amount if the validation code and/or the transaction card code are not valid or active for parking validation). This reduces a complexity associated with parking validation as multiple interactions with the exit terminal are not required. For example, this conserves resources (e.g., memory resources, processing resources, and/or network resources) that would have otherwise been used by the exit terminal to determine if the parking validation is valid, communicate to the user a reduced amount or that the parking validation is not valid, receive additional information for the payment of the parking charge, and communicate with the transaction backend to complete the payment of the parking charge. Rather, a single interaction between the transaction card and the exit terminal may enable the exit terminal to identify whether parking validation should be applied, apply any reduction to an amount of the parking charge, and/or charge an account associated with the transaction card for a full or partial amount of the parking charge.

Moreover, as the data that indicates whether parking validation has been provided is securely stored in the memory of the transaction card (and/or the server device), a security associated with the parking validation is improved. For example, as the transaction card may be the same transaction card that is involved in a transaction that enables, or triggers, parking validation to be provided, the transaction card may be enabled to store an indicator or a flag (e.g., the validation code or the transaction card code) that can be securely provided to the exit terminal to indicate that parking validation has been provided to the user associated with the transaction card. Moreover, as the validation code may only be provided digitally to the transaction card (e.g., by the transaction terminal), a malicious actor may be unable to obtain the validation code without actually completing a transaction via an interaction of a transaction card with the transaction terminal. As a result, a likelihood that the malicious actor is able to fraudulently obtain the validation code is reduced.

After the payment of the parking charge is completed (e.g., via the amount of the parking charge being reduced to zero or by charging the account associated with the transaction card), the exit terminal may perform an action to enable the vehicle to leave the parking location. For example, the exit terminal may perform an action to cause a gate or other obstruction to be temporarily displaced, such that the vehicle is enabled to drive through the exit of the parking location.

As indicated above, FIGS. 1A-1C are provided as an example. Other examples may differ from what is described with regard to FIGS. 1A-1C.

Figure 2:
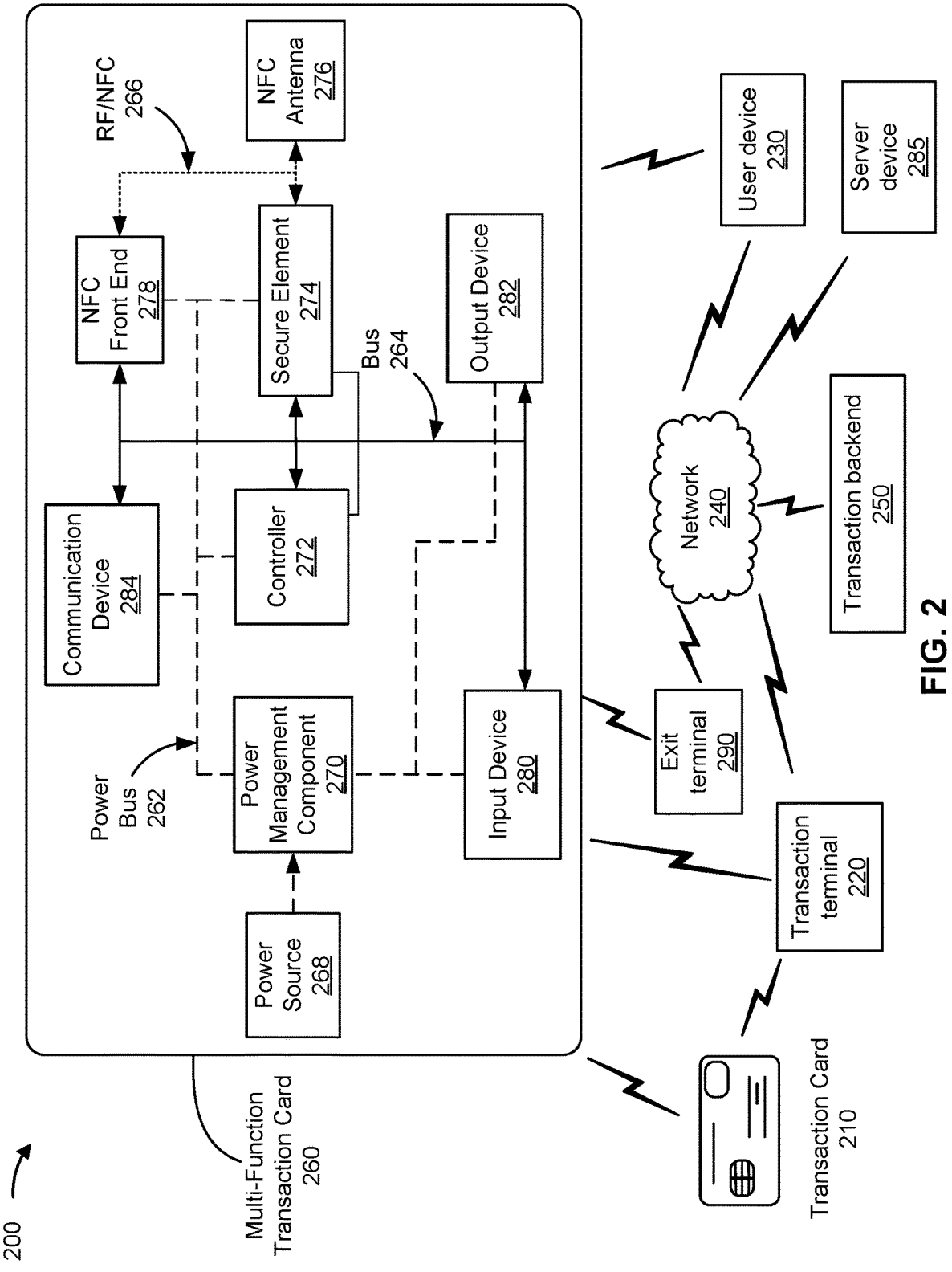
FIG. 2 is a diagram of an example environment in which systems and/or methods described herein may be implemented.

FIG. 2 is a diagram of an example environment 200 in which systems, devices, and/or methods, described herein, may be implemented. As shown in FIG. 2, environment 200 may include a transaction card 210, a transaction terminal 220, a user device 230, a network 240, a transaction backend 250, a multi-function transaction card 260, a server device 285, and an exit terminal 290. Devices of environment 200 may interconnect via wired connections, wireless connections, or a combination of wired and wireless connections.

Transaction card 210 includes a transaction card capable of storing and/or communicating data for a PoS transaction with transaction terminal 220 and/or multi-function transaction card 260. For example, transaction card 210 may store or communicate data including account information (e.g., an account identifier, a cardholder identifier, etc.), expiration information of transaction card 210, banking information, transaction information (e.g., a payment token), and/or the like. For example, to store or communicate the data, transaction card 210 may include a magnetic stripe and/or an IC chip (e.g., a EUROPAY®, MASTERCARD®, and VISA® (EMV) chip and/or the like). In some implementations, transaction card 210 may include an antenna to communicate data associated with transaction card 210, and/or may be capable of communicating wirelessly (e.g., via Bluetooth, Bluetooth Low Energy (BLE), near-field communication (NFC), and/or the like) with another device, such as transaction terminal 220 and/or multi-function transaction card 260, a digital wallet, and/or the like. In some implementations, transaction card 210 may communicate with transaction terminal 220 and/or multi-function transaction card 260 to complete a transaction (e.g., based on being moved within communicative proximity of transaction terminal 220 and/or multi-function transaction card 260).

Transaction terminal 220 includes one or more devices to facilitate processing a transaction via transaction card 210 and/or multi-function transaction card 260. Transaction terminal 220 may include a PoS terminal, a security access terminal, an ATM terminal, and/or the like. Transaction terminal 220 may include one or more input devices and/or output devices to facilitate obtaining transaction card data from transaction card 210 and/or multi-function transaction card 260, and/or interaction or authorization from a cardholder of transaction card 210 and/or multi-function transaction card 260. Example input devices of transaction terminal 220 may include a number keypad, a touchscreen, a magnetic stripe reader, a chip reader, and/or an RF signal reader. Example output devices of transaction terminal 220 may include a display device, a speaker, a printer, and/or the like.

User device 230 includes one or more devices capable of receiving, generating, storing, processing, and/or providing information associated with transaction card 210 and/or multi-function transaction card 260. For example, user device 230 may include a communication device and/or a computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, user device 230 may include application logic capable of facilitating communications between transaction terminal 220 and multi-function transaction card 260.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Transaction backend 250 includes one or more devices associated with a bank and/or a transaction card association that authorizes transactions and/or facilitates a transfer of funds or payments between an account of a cardholder of transaction card 210 and/or multi-function transaction card 260 and an account of an individual or business of transaction terminal 220. For example, transaction backend 250 may include one or more devices of one or more issuing banks associated with a cardholder of transaction card 210 and/or multi-function transaction card 260, one or more devices of one or more acquiring banks (or merchant banks) associated with transaction terminal 220, and/or one or more devices associated with one or more card associations (e.g., VISA®, MASTERCARD®, and/or the like) associated with transaction card 210 and/or multi-function transaction card 260. Accordingly, in response to receiving transaction card data associated with transaction card 210 and/or multi-function transaction card 260 from transaction terminal 220, various banking institutions and/or card associations of transaction backend 250 may communicate to authorize the transaction and/or transfer funds between the accounts associated with transaction card 210, multi-function transaction card 260, and/or transaction terminal 220.

Multi-function transaction card 260 includes a transaction card capable of storing and/or communicating data for a PoS transaction with transaction terminal 220, and capable of receiving and/or storing data for a PoS transaction with transaction card 210. For example, multi-function transaction card 260 may store or communicate data including account information (e.g., an account identifier, a cardholder identifier, etc.), expiration information of multi-function transaction card 260, banking information, transaction information (e.g., a payment token), and/or the like. For example, to store or communicate the data, multi-function transaction card 260 may include a magnetic stripe and/or an IC chip (e.g., an EMV chip and/or the like).

In some implementations, multi-function transaction card 260 may include a card body in or on which various components are embedded. In some implementations, multi-function transaction card 260 may include an antenna to communicate data associated with transaction terminal 220 and/or transaction card 210 and/or may be capable of communicating wirelessly (e.g., via Bluetooth, BLE, NFC, and/or the like) with another device, such as transaction terminal 220, transaction card 210, a digital wallet, and/or the like. In some implementations, multi-function transaction card 260 may communicate with transaction terminal 220, transaction card 210, and/or the like to complete a transaction (e.g., based on being moved within communicative proximity of transaction terminal 220, transaction card 210, and/or the like). In some implementations, multi-function transaction card 260 may include one or more components and/or one or more functionalities of transaction terminal 220 and/or one or more components and/or functionalities of transaction card 210.

Power bus 262 includes a component that permits the delivery of power to various components of multi-function transaction card 260. Bus 264 includes a component that permits communication among various components of multi-function transaction card 260. RF/NFC 266 may include a communication link that permits data delivery between secure element 274, NFC antenna 276, and NFC front end 278.

Power source 268 includes one or more devices, internal to multi-function transaction card 260, capable of supplying power. For example, power source 268 may include a battery (e.g., a rechargeable battery, a non-rechargeable battery, and/or the like), a power supply, a capacitor (e.g., a supercapacitor, an ultracapacitor, and/or the like), and/or the like. In some implementations, multi-function transaction card 260 (e.g., controller 272, secure element 274, and/or NFC front end 278) may obtain power from power source 268 when multi-function transaction card 260 is to perform a transaction. In some aspects, multi-function transaction card 260 may include a single power source 268, which may supply power for performing a transaction and/or may supply power to one or more other components of multi-function transaction card 260 (e.g., a processor, a storage component, an input component, an output component, a communication interface, and/or the like). In some aspects, multi-function transaction card 260 may include multiple power sources 268. In some aspects, a single power source 268 may be dedicated to supplying power solely for performing a transaction, while other power sources 268 may supply power to other components of multi-function transaction card 260. In some implementations, multi-function transaction card 260 may include one or more solar cells and associated circuitry that enable various components of multi-function transaction card 260 to be powered by solar energy.

Power management component 270 includes one or more devices capable of controlling the delivery of power to various components of multi-function transaction card 260 and/or controlling charging of power source 268. For example, power management component 270 may include a switch, a gate, a controller, a regulator, a processing component, a bidirectional logic level shifter, a diode, and/or the like. In some implementations, power management component 270 may control signals between controller 272 and secure element 274 (e.g., to couple or decouple controller 272 and secure element 274, to prevent signals from being passed between controller 272 and secure element 274, and/or the like).

Controller 272 includes one or more devices capable of receiving, generating, storing, processing, and/or providing information and/or instructions that assist with performing a transaction. For example, controller 272 may include a processor, a memory, and/or the like, as described elsewhere herein. In some implementations, controller 272 may be directly, communicatively coupled to secure element 274 (e.g., via a dedicated, single-wire communication link).

Secure element 274 includes one or more devices capable of securely hosting an operating system and/or an application, and/or storing confidential information (e.g., a credential, cryptographic information, and/or the like). For example, secure element 274 may include a universal integrated circuit card (UICC), a secure digital (SD) card (e.g., a microSD card and/or the like), an embedded secure element, and/or the like. In some implementations, secure element 274 may include a tamper resistant hardware platform. In some implementations, secure element 274 may include one or more processors (e.g., one or more microcontrollers) certified by a standard body group, such as an EMV Consortium (EMVCo) certified (e.g., 16-bit and/or the like) secure microcontroller. In some implementations, secure element 274 may host a personalized card application and a cryptographic key required to perform a financial transaction (e.g., with transaction terminal 220). In some implementations, secure element 274 may store a credential associated with multi-function transaction card 260 and/or another transaction card, such as a username, a password, biometric information, a token, a certificate for signing documents, and/or the like.

In some implementations, secure element 274 may include application logic configured to communicate with NFC front end 278 (e.g., to cause NFC front end 278 to provide card data from secure element 274 to transaction terminal 220 to submit a payment, to cause NFC front end 278 to receive card data from another transaction card (e.g., transaction card 210) to process a payment, and/or the like). In some implementations, secure element 274 may include application logic configured to communicate with controller 272 (e.g., to cause controller 272 to communicate with a user device (e.g., user device 230) to facilitate online data authentication relating to a transaction (e.g., with transaction card 210), to receive instructions from controller 272 to initiate transaction processing (e.g., associated with transaction card 210), and/or the like). In some implementations, secure element 274 may include application logic configured to receive inputs from input device 280 (e.g., directly or via controller 272), to provide outputs to output device 282 (e.g., directly or via controller 272), and/or the like.

NFC antenna 276 includes an antenna capable of transmitting and/or receiving information using an NFC protocol. For example, NFC antenna 276 may include a loop antenna (e.g., an NFC loop antenna), an inductor (e.g., an NFC inductor), and/or the like. In some implementations, NFC antenna 276 may be integrated into, or with, secure element 274 and/or NFC front end 278 (e.g., may be part of the same integrated circuit, such as a transaction IC).

NFC front end 278 includes one or more devices capable of communicating with external devices, such as transaction card 210 and/or transaction terminal 220, using an NFC protocol. NFC front end 278 may include one or more radio modules for receiving and/or emitting NFC signals. NFC front end 278 may include one or more processors (e.g., microprocessor(s), microcontroller(s), and/or the like) and/or be coupled to one or more processors, such as controller 272, processor(s) included in secure element 274, and/or the like.

Although not shown, in some implementations, multi-function transaction card 260 may include a transaction IC that includes an integrated circuit connecting secure element 274, NFC antenna 276, and/or one or more other components of multi-function transaction card 260. For example, the transaction IC may include secure element 274, NFC antenna 276, NFC front end 278, connection(s) between secure element 274, NFC antenna 276, and NFC front end 278, and/or the like.

Input device 280 includes one or more components that permit multi-function transaction card 260 to receive information, such as via user input (e.g., to initiate a transaction, such as to receive card data from transaction card 210). For example, input device 280 may include an input component described elsewhere herein. Output device 282 includes one or more components that permit multi-function transaction card 260 to provide output information (e.g., relating to transaction processing associated with transaction card 210 and/or transaction terminal 220). For example, output device 282 may include an output component described elsewhere herein. Communication device 284 includes a transceiverlike component that enables multi-function transaction card 260 to communicate with other devices. For example, communication device 284 may include a communication component described elsewhere herein.

The server device 285 includes one or more devices capable of receiving, generating, storing, processing, providing, and/or routing information associated with a card (e.g., a multi-function transaction card) for secure parking validation, as described elsewhere herein. The server device 285 may include a communication device and/or a computing device. For example, the server device 285 may include a server, such as an application server, a client server, a web server, a database server, a host server, a proxy server, a virtual server (e.g., executing on computing hardware), or a server in a cloud computing system. In some implementations, the server device 285 includes computing hardware used in a cloud computing environment.

Exit terminal 290 includes one or more devices to facilitate processing a transaction via transaction card 210 and/or multi-function transaction card 260. Exit terminal 290 may include a PoS terminal, a security access terminal, an ATM terminal, and/or the like. Exit terminal 290 may include one or more input devices and/or output devices to facilitate obtaining transaction card data from transaction card 210 and/or multi-function transaction card 260, and/or interaction or authorization from a cardholder of transaction card 210 and/or multi-function transaction card 260. Example input devices of exit terminal 290 may include a number keypad, a touchscreen, a magnetic stripe reader, a chip reader, and/or an RF signal reader. Example output devices of exit terminal 290 may include a display device, a speaker, a printer, and/or the like. In some implementations, exit terminal 290 may be associated with facilitating transactions associated with a parking location, such as a parking lot or a parking garage.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
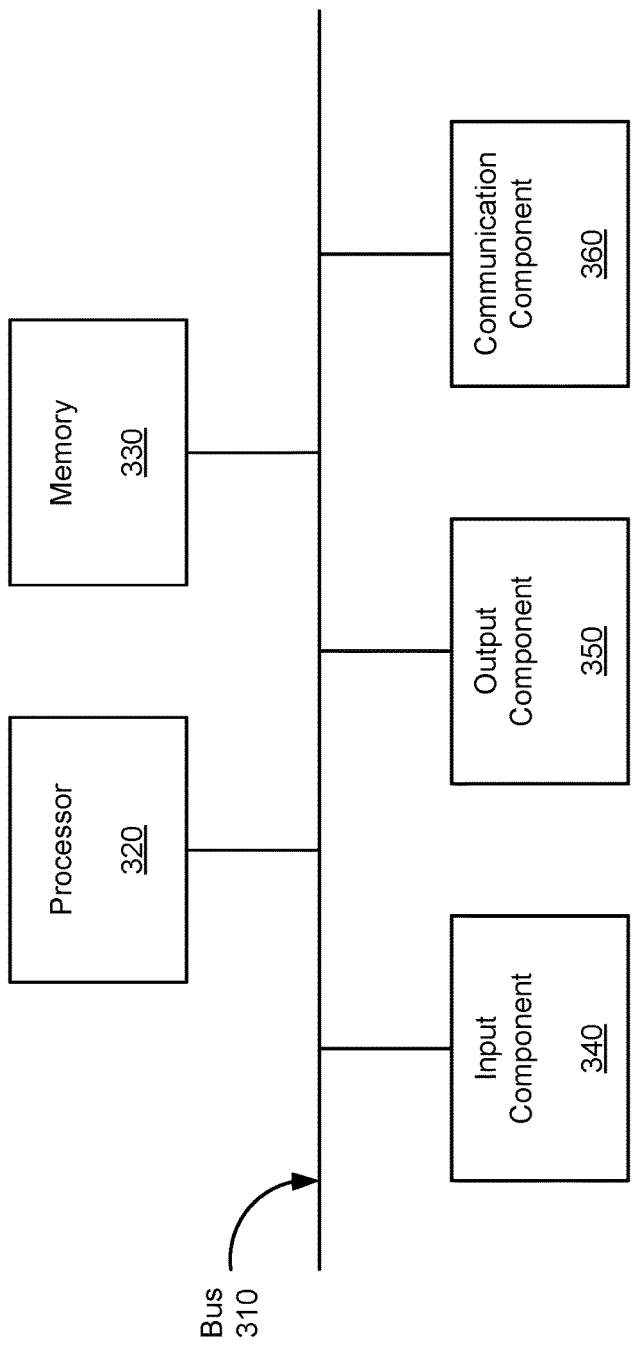
FIG. 3 is a diagram of example components of one or more devices of FIG. 2.

FIG. 3 is a diagram of example components of a device 300, which may correspond to the transaction card 210, the transaction terminal 220, the user device 230, the transaction backend 250, the multi-function transaction card 260, the server device 285, and/or the exit terminal 290. In some implementations, the transaction card 210, the transaction terminal 220, the user device 230, the transaction backend 250, the multi-function transaction card 260, the server device 285, and/or the exit terminal 290 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with a card for secure parking validation. In some implementations, one or more process blocks of FIG. 4 may be performed by a transaction card (e.g., the multi-function transaction card 260). In some implementations, one or more process blocks of FIG. 4 may be performed by another device or a group of devices separate from or including the transaction card, such as the transaction card 210, the transaction terminal 220, the user device 230, the transaction backend 250, the server device 285, and/or the exit terminal 290. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include executing an application stored in a memory of the transaction card (block 410). In some implementations, the application is associated with enabling the transaction card to store and transmit validation codes. As further shown in FIG. 4, process 400 may include communicating with an exchange terminal to complete the first exchange associated with an entity (block 420). In some implementations, completing the first exchange is associated with the entity providing a validation of a second exchange associated with a charge for parking a vehicle. As further shown in FIG. 4, process 400 may include receiving, from the exchange terminal, an indication of the validation code associated with at least one of the entity or a location based on communicating with the exchange terminal to complete the first exchange (block 430). In some implementations, the validation code indicates the validation of the second exchange. As further shown in FIG. 4, process 400 may include storing the validation code and a time indicator associated with receiving the indication of the validation code (block 440). In some implementations, the time indicator indicates at least one of an exchange time associated with the first exchange or an amount of time for which the validation code is valid. As further shown in FIG. 4, process 400 may include transmitting, to an exit terminal, an indication of the validation code and the time indicator to cause an amount associated with the second exchange to be at least partially reduced (block 450). In some implementations, the exit terminal is associated with completing exchanges for vehicles parked in the location.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flowchart of an example process 500 associated with a card for secure parking validation. In some implementations, one or more process blocks of FIG. 5 may be performed by a device (e.g., transaction terminal 220). In some implementations, one or more process blocks of FIG. 5 may be performed by another device or a group of devices separate from or including the device, such as the transaction card 210, the user device 230, the transaction backend 250, the multi-function transaction card 260, the server device 285, and/or the exit terminal 290. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a transaction card, an identifier of the transaction card or an account associated with completing an exchange with an entity associated with the terminal (block 510). As further shown in FIG. 5, process 500 may include receiving, from the transaction card, an indication of a code associated with the transaction card (block 520). In some implementations, the code is associated with validating a parking charge for a vehicle of a user associated with the exchange. As further shown in FIG. 5, process 500 may include determining whether to add the code to a database associated with validating parking charges based on exchange information associated with the exchange (block 530). As further shown in FIG. 5, process 500 may include transmitting, to a server device, an indication of the code based on determining to add the code to the database associated with validating parking charges (block 540). In some implementations, transmitting the indication of the code causes the server device to add the code to the database. In some implementations, transmitting the indication of the code causes an amount associated with the parking charge for the vehicle to be at least partially reduced.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A card for secure parking validation by storing a validation code in the card that is associated with a first exchange associated with an entity, the card comprising:
   a secure element configured to store a parking validation application, wherein the parking validation application is stored on the card by an issuing entity of the card;
   a radio frequency (RF) component;
   an integrated circuit (IC) chip component;
   one or more memories; and
   one or more processors, coupled to the one or more memories, configured to:
      execute an application stored in the one or more memories, wherein the application is associated with enabling the card to store and transmit validation codes;
      communicate, via the RF component or the IC chip component, with an exchange terminal to complete the first exchange, wherein completing the first exchange is associated with the entity providing a validation of a second exchange associated with a charge for parking a vehicle, and wherein completing the first exchange includes:
         providing a card identifier associated with the card to the exchange terminal to charge an account related to the card for an amount associated with the first exchange, and
         causing the card identifier to be added to a parking validation database associated with an exit terminal associated with a location;
      receive, via the RF component or the IC chip component and from the exchange terminal, an indication of the validation code associated with at least one of the entity or the location based on communicating with the exchange terminal to complete the first exchange, wherein the validation code indicates the validation, by the entity, of the second exchange;
      store, in the one or more memories and via the application, the validation code and a time indicator associated with receiving the indication of the validation code;
      detect, via the RF component or the IC chip component, that the card is within a communicative proximity of the exit terminal; and
      transmit, via the RF component or the IC chip component and to the exit terminal, an indication of the card identifier, an indication of the validation code, and the time indicator to cause an amount associated with the second exchange to be at least partially reduced when the card identifier matches another card identifier stored in the parking validation database and when an amount of time from a time associated with when the card identifier was added to the parking validation database is within a threshold amount of time,
      wherein the exit terminal automatically displaces an obstruction associated with the location based on receiving the indication of the validation code and the time indicator.

2. The card of claim 1, wherein the one or more processors, to transmit the indication of the card identifier, the indication of the validation code, and the time indicator, are configured to:
   transmit, to the exit terminal, an indication of at least one of:
      an entity identifier associated with the entity,
      an identifier associated with the exit terminal, or
      an identifier associated with the location.

3. The card of claim 1, wherein receiving the indication of the validation code is based on the amount associated with the first exchange satisfying an amount threshold.

4. The card of claim 1, wherein transmitting the indication of the card identifier, the indication of the validation code, and the time indicator causes the exit terminal to at least partially reduce the amount associated with the second exchange based on the validation code being valid and based on a difference, between a first time indicated by the time indicator and a second time at which the validation code is transmitted to the exit terminal, satisfying a time threshold.

5. The card of claim 1, wherein the validation code is valid for an amount of time from a time associated with the first exchange.

6. The card of claim 1, wherein the one or more processors, to transmit the indication of the card identifier, the indication of the validation code, and the time indicator, are configured to:
   cause a remaining amount of the amount associated with the second exchange to be satisfied using resources of the account related to the card.

7. The card of claim 1, wherein the one or more processors are further configured to:
   receive, from a user device, instructions to install the application in the one or more memories, wherein the application enables the card to store the validation code and to transmit the indication of the validation code.

8. The card of claim 1, wherein the one or more processors are further configured to:
   store the application in the one or more memories, wherein the application is stored in a read-only memory of the one or more memories.

9. A method for secure parking validation by storing a validation code in a transaction card that is associated with a first exchange associated with an entity, comprising:
   executing, by the transaction card, an application stored in a memory of the transaction card, wherein the application is associated with enabling the transaction card to store and transmit validation codes, and wherein the application is stored on the transaction card by an issuing entity of the transaction card;
   communicating, by the transaction card, with an exchange terminal to complete the first exchange, wherein completing the first exchange is associated with the entity providing a validation of a second exchange associated with a charge for parking a vehicle, and wherein completing the first exchange includes:
      providing a card identifier associated with the transaction card to the exchange terminal to charge an account related to the transaction card for an amount associated with the first exchange, and causing the card identifier to be added to a database associated with validating parking charges;

receiving, by the transaction card and from the exchange terminal, an indication of the validation code associated with at least one of the entity or a location based on communicating with the exchange terminal to complete the first exchange, wherein the validation code indicates the validation of the second exchange;

storing, by the transaction card in the memory of the transaction card, the validation code and a time indicator associated with receiving the indication of the validation code, wherein the time indicator indicates at least one of an exchange time associated with the first exchange or an amount of time for which the validation code is valid;

transmitting, by the transaction card and to an exit terminal, the card identifier, an indication of the validation code, and the time indicator to cause an amount associated with the second exchange to be at least partially reduced when the card identifier matches another card identifier stored in the database and when an amount of time from a time associated with when the card identifier was added to the database is within a threshold amount of time, wherein the exit terminal is associated with completing exchanges for vehicles parked in the location; and automatically displacing, by the exit terminal and based on receiving the indication of the validation code and the time indicator, an obstruction associated with the location.

10. The method of claim 9, comprising:

transmitting, to the exit terminal, an indication of at least one of:

an entity identifier associated with the entity, an identifier associated with the exit terminal, or an identifier associated with the location.

11. The method of claim 9, wherein receiving the indication of the validation code is based on the amount associated with the first exchange satisfying an amount threshold.

12. The method of claim 9, wherein transmitting the card identifier, the indication of the validation code, and the time indicator causes the exit terminal to at least partially reduce the amount associated with the second exchange based on the validation code being valid and based on a difference, between a first time indicated by the time indicator and a second time at which the validation code is transmitted to the exit terminal, satisfying a time threshold.

13. The method of claim 9, wherein the validation code is valid for an amount of time from a time associated with the first exchange.

14. The method of claim 9, wherein transmitting the card identifier, the indication of the validation code, and the time indicator causes the amount associated with the second exchange to be partially reduced and causes a remaining amount of the second exchange to be completed using resources of the account related to the transaction card.

15. The method of claim 9, further comprising:

receiving, from a user device, instructions to install the application in the memory, wherein the application enables the transaction card to store the validation code and to transmit the indication of the validation code.

16. A non-transitory computer-readable medium storing a set of instructions, the set of instructions comprising:

one or more instructions that, when executed by one or more processors of a terminal, cause the terminal to:

receive, from a transaction card, an identifier of the transaction card or an identifier of an account related to the transaction card, wherein the transaction card includes a secure element configured to store a parking validation application that is stored on the transaction card by an issuing entity of the transaction card, wherein the transaction card is associated with completing an exchange with an entity associated with the terminal, and wherein completing the exchange includes a charge to the account related to the transaction card for an exchange amount associated with the exchange;

receive, from the transaction card, an indication of a code associated with identifying the transaction card, wherein the code is associated with validating a parking charge for a vehicle of a user associated with the exchange;

determine whether to add the code to a database associated with validating parking charges based on exchange information associated with the exchange; and transmit, to a server device, an indication of the code based on determining to add the code to the database, wherein transmitting the indication of the code causes the server device to add the code to the database, wherein transmitting the indication of the code causes an amount associated with the parking charge for the vehicle to be at least partially reduced when a transaction card identifier provided to an exit terminal associated with a parking location matches the transaction card identified by the code and when an amount of time from a time associated with when the code was added to the database is within a threshold amount of time, and wherein transmitting the indication of the code automatically displaces an obstruction related to the vehicle.

17. The non-transitory computer-readable medium of claim 16, wherein the one or more instructions, when executed by the one or more processors, further cause the terminal to:

transmit, to the transaction card, an indication of a validation code, wherein the validation code enables the amount associated with the parking charge for the vehicle to be at least partially reduced when the validation code is provided to the exit terminal.

18. The non-transitory computer-readable medium of claim 17, wherein the one or more instructions, when executed by the one or more processors, further cause the terminal to:

receive an indication of, or determine, a new validation code in accordance with a periodic schedule; and transmit, to another transaction card, an indication of the new validation code based on the other transaction card being associated with another exchange associated with the terminal and the entity.

19. The non-transitory computer-readable medium of claim 16, wherein the one or more instructions, when executed by the one or more processors, further cause the terminal to:

program a communication component of the terminal to communicate with an applet executing on one or more processors of the transaction card, wherein the applet is associated with providing the code or receiving a validation code associated with parking charges, and wherein programming the communication component enables the terminal to communicate with the transaction card via the applet.

20. The non-transitory computer-readable medium of claim 16, wherein the one or more instructions, that cause the terminal to determine whether to add the code to the database, cause the terminal to:

determine whether the exchange amount associated with the exchange satisfies a threshold; and determine to add the code to the database if the exchange amount satisfies the threshold.

\* \* \* \* \*